(12) United States Patent
Miyanaga

(10) Patent No.: US 10,335,980 B2
(45) Date of Patent: Jul. 2, 2019

(54) DUST SUCTION DRILL AND DUST SUCTION UNIT

(71) Applicant: KABUSHIKI KAISHA MIYANAGA, Miki-shi, Hyogo (JP)

(72) Inventor: Masaaki Miyanaga, Miki (JP)

(73) Assignee: KABUSHIKI KAISHA MIYANAGA, Miki-shi, Hyogo (JP)

( * ) Notice: Subject to any disclaimer, the term of this patent is extended or adjusted under 35 U.S.C. 154(b) by 0 days.

(21) Appl. No.: 15/550,736

(22) PCT Filed: Feb. 9, 2016

(86) PCT No.: PCT/JP2016/000663
§ 371 (c)(1),
(2) Date: Aug. 11, 2017

(87) PCT Pub. No.: WO2016/129268
PCT Pub. Date: Aug. 18, 2016

(65) Prior Publication Data
US 2018/0015639 A1    Jan. 18, 2018

(30) Foreign Application Priority Data
Feb. 13, 2015    (JP) ................. 2015-026218

(51) Int. Cl.
*B23B 51/06* (2006.01)
*B28D 7/02* (2006.01)
(Continued)

(52) U.S. Cl.
CPC ............... *B28D 7/02* (2013.01); *B23B 51/06* (2013.01); *B23Q 11/0046* (2013.01);
(Continued)

(58) Field of Classification Search
CPC ............................. B28D 7/02; B23B 2251/68
See application file for complete search history.

(56) References Cited

U.S. PATENT DOCUMENTS 5,996,714 A    12/1999  Massa et al.
6,065,908 A    5/2000   Kleine et al.
(Continued)

FOREIGN PATENT DOCUMENTS

CN    1232741 A     10/1999
CN    103056916 A   4/2013
(Continued)

OTHER PUBLICATIONS

International Search Report for PCT/JP2016/000663, dated Mar. 15, 2016.
(Continued)

*Primary Examiner* — Alan Snyder
(74) *Attorney, Agent, or Firm* — Marshall, Gerstein & Borun LLP

(57) ABSTRACT

A dust suction drill includes: a drill tip with cutting edge portions; a shaft joined to the drill tip and configured to rotate about an axis; and a dust suction passage that is generated when the cutting edge portions rotate, the dust suction passage being formed inside the shaft. The cutting edge portions are provided on a distal end surface of the drill tip and spaced apart from each other in a circumferential direction. Cutting edges, each of which is formed by a joint ridge between a rake face and a relief face of a corresponding one of the cutting edge portions, are arranged radially, and at a center of the drill tip, form a chisel point, which is a pointed end. A dust suction hole, which communicates with the dust suction passage, is formed in the rake face or the relief face closely to the chisel point.

7 Claims, 9 Drawing Sheets

(51) Int. Cl.
*B23Q 11/00* (2006.01)
*B28D 1/14* (2006.01)

(52) U.S. Cl.
CPC ......... *B28D 1/146* (2013.01); *B23B 2226/75* (2013.01); *B23B 2251/68* (2013.01)

(56) References Cited

U.S. PATENT DOCUMENTS

| | | | |
|---|---|---|---|
| 6,189,633 B1 | 2/2001 | Kleine et al. | |
| 7,513,722 B2 * | 4/2009 | Greenberg | B23B 49/005 408/202 |
| 2001/0006121 A1 * | 7/2001 | Kleine | B23B 51/06 175/213 |
| 2010/0003097 A1 | 1/2010 | Kitsukawa | |
| 2014/0086697 A1 * | 3/2014 | Kakimoto | B23B 51/009 407/115 |

FOREIGN PATENT DOCUMENTS

| | | |
|---|---|---|
| EP | 0855244 A2 | 7/1998 |
| EP | 1112808 A2 | 7/2001 |
| EP | 2 428 313 A1 | 3/2012 |
| EP | 2428313 B1 | 6/2013 |
| JP | H6-16012 | 3/1994 |
| JP | H0616012 U | 3/1994 |
| JP | 9-272118 | 10/1997 |
| JP | 11-10638 | 1/1999 |
| JP | 2001-54837 A | 2/2001 |
| JP | 2010-201733 A | 9/2010 |

OTHER PUBLICATIONS

Office Action and Search Report for Chinese Patent Application No. 201680003078.6, dated Oct. 12, 2018.
Extended European Search Report for EP16748914.5, dated Sep. 4, 2018.

* cited by examiner

DUST SUCTION DRILL AND DUST SUCTION UNIT

TECHNICAL FIELD

The present invention relates to a dust suction drill and a dust suction unit that are used for performing the work of drilling a hole in a drilling object, such as concrete or stone, and that are configured to suck dust generated during the hole drilling.

BACKGROUND ART

Conventionally, there are often cases where a pilot hole called an "anchor bolt hole" is drilled in concrete or stone in advance of embedding a metal anchor bolt in the concrete or stone. In order to realize great pull-out resisting strength of the anchor bolt embedded in the pilot hole, it is necessary to remove dust, such as swarf, from the inside of the pilot hole in advance of embedding the anchor bolt in the pilot hole. It is also required that the work environment be considered when performing the work of drilling a hole in concrete or stone so that powder dust will not be scattered to the surroundings.

In view of the above, conventionally, a dust suction drill that removes dust at the same time as drilling a hole has been proposed (see Patent Literature 1). The dust suction drill is formed as follows: as shown in FIG. 16, two slits 29 are formed in a distal end surface 3a of a drill shaft 3, which rotates about an axis line L; and plate-shaped cutting edges 21 are inserted in the respective slits 29. The distal end surface of each cutting edge 21 is inclined to form an upward slope toward the radius center of the drill shaft 3. A dust suction hole 24 or dust suction holes 24 intended for sucking dust is/are formed in the distal end surface of the drill shaft 3, such that the dust suction hole(s) 24 is/are positioned at the side of the slits 29. A dust suction device (not shown) is connected to the dust suction hole(s) 24. When the drill shaft 3 rotates about the axis line L and the cutting edges 21 drill a hole in a drilling object, dust is generated, and the generated dust is sucked by the dust suction device through the dust suction hole(s) 24.

CITATION LIST

Patent Literature

PTL 1: U.S. Pat. No. 5,996,714

SUMMARY OF INVENTION

Technical Problem

Since the cutting edges 21 of the drill shaft disclosed in Patent Literature 1 are plate-shaped, the dust suction hole(s) 24 is/are displaced from the apex of the cutting edges 21 at least by the thickness of the cutting edge 21. For this reason, there is a risk that the dust generated by the distal ends of the cutting edges 21 during the hole drilling is not sufficiently sucked through the dust suction hole(s) 24.

An object of the present invention is to provide a dust suction drill capable of sucking dust with high efficiency when drilling a hole.

Solution to Problem

A dust suction drill according to the present invention includes: a drill tip with cutting edge portions formed on a distal end of the drill tip; a shaft joined to the drill tip and configured to rotate about an axis line; and a dust suction passage for sucking dust that is generated when the cutting edge portions rotate, the dust suction passage being formed inside the shaft. The cutting edge portions and the drill tip are made of a metal and integrally formed together. The cutting edge portions are provided on a distal end surface of the drill tip and spaced apart from each other in a circumferential direction. Cutting edges, each of which is formed by a joint ridge between a rake face and a relief face of a corresponding one of the cutting edge portions, are arranged radially, and at a center of the drill tip, form a chisel point, which is a pointed end. A dust suction hole, which communicates with the dust suction passage, is formed in the rake face or the relief face closely to the chisel point, or formed over the joint ridge of the rake face or the relief face closely to the chisel point.

The dust suction passage is formed extending substantially parallel to the axis line. An auxiliary passage, which communicates with the dust suction passage and in which a removal member for pushing dust out of the dust suction passage is insertable, is formed in the shaft.

Advantageous Effects of Invention

1. Since each cutting edge portion and the drill tip are both made of a metal and integrally formed together, the dust suction hole can be formed in the rake face or the relief face of the cutting edge portion closely to the chisel point. Consequently, dust generated by the chisel point during hole drilling is efficiently sucked into the dust suction hole. Since the chisel point is a pointed end, the chisel point is in point contact with a drilling object during the hole drilling. This makes it possible to prevent axial runout of the dust suction drill.

2. During the use of the dust suction drill, there is a case where dust and the like clog the inside of the dust suction passage. In this case, the removal member is inserted from the auxiliary passage, and the distal end of the removal member is inserted into the dust suction passage. By pushing the clogging dust and the like out of the dust suction passage with the distal end of the removal member, the dust and the like can be easily removed from the dust suction passage.

DESCRIPTION OF EMBODIMENTS (Embodiment 1)

Figure 1:
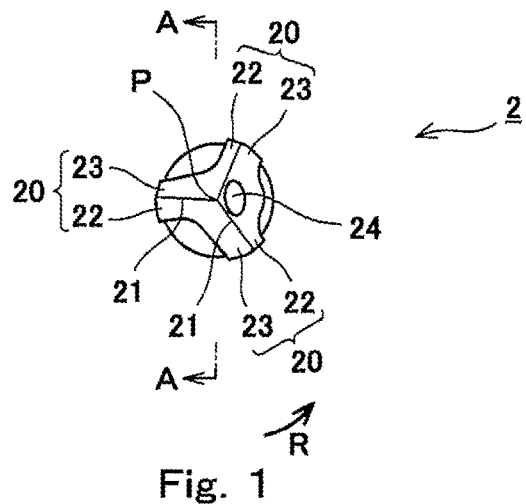
FIG. 1 is a plan view of a dust suction drill.

Hereinafter, embodiments of the present invention are described in detail with reference to the drawings. In the drawings, the same or corresponding elements are denoted by the same reference signs, and repeating the same descriptions is avoided below.

Figure 2:
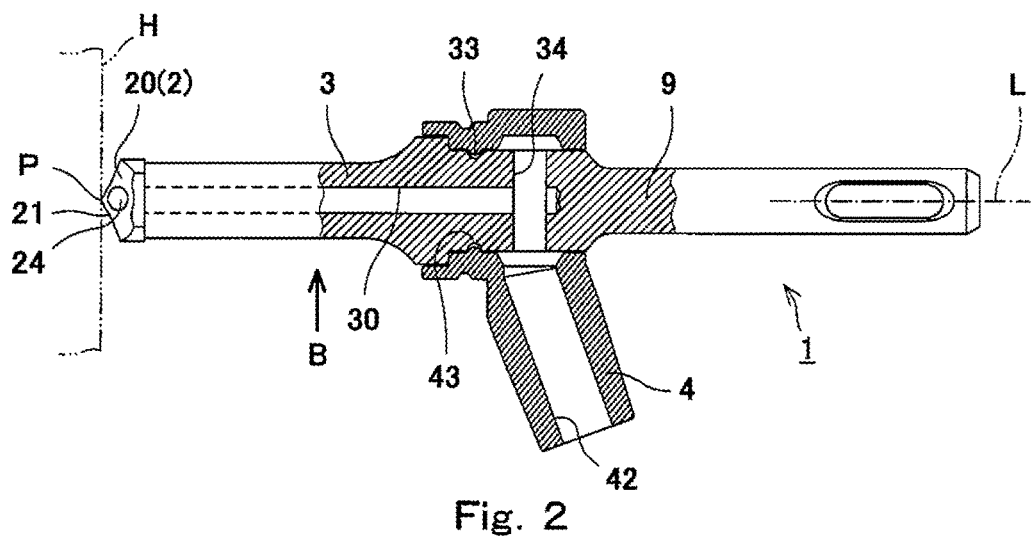
FIG. 2 is a partially cutaway elevation view of the dust suction drill of FIG. 1 cut along a plane including a line A-A of FIG. 1.
Figure 3:
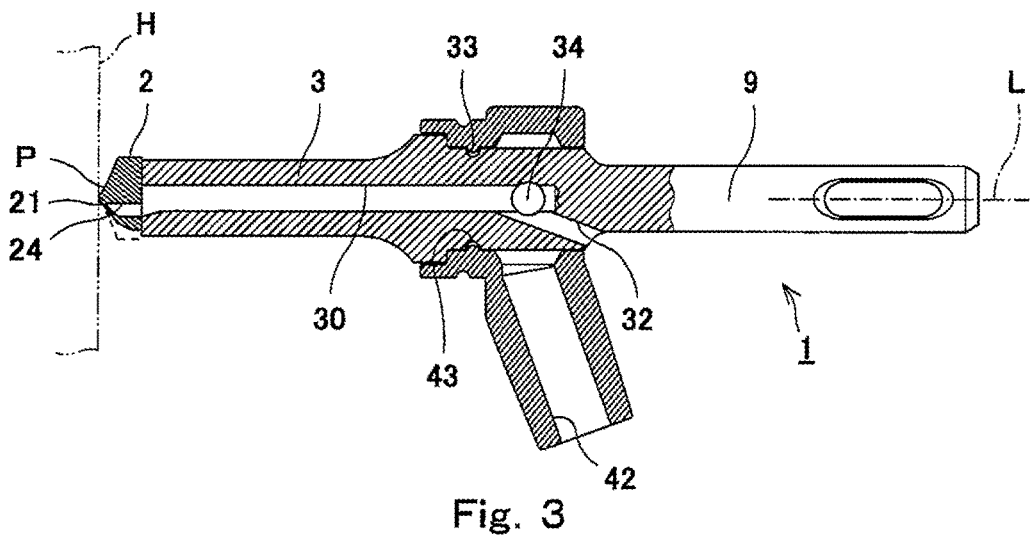
FIG. 3 is a sectional view of the dust suction drill of FIG. 2 as seen in a direction B of FIG. 2.

FIG. 1 is a plan view of a dust suction drill according to the present embodiment. FIG. 2 is a partially cutaway elevation view of the dust suction drill of FIG. 1 cut along a plane including a line A-A of FIG. 1. FIG. 3 is a sectional view of the dust suction drill of FIG. 2 as seen in a direction B of FIG. 2. A dust suction drill 1 includes: a drill tip 2 with cutting edge portions 20 formed on a distal end of the drill tip 2; a shaft 3 with a round cross section, the shaft 3 being joined to the drill tip 2 and extending along an axis line L; and a shank 9 with a regular polygonal cross section, the shank 9 being continuous with the shaft 3. The shank 9 is attached to an electric drilling tool (not shown), and the dust suction drill 1 rotates about the axis line L. In the description below, one side of the dust suction drill 1 on which the drill tip 2 is provided is referred to as the front side, and the other side of the dust suction drill 1 on which the shank 9 is provided is referred to as the rear side. The drill tip 2 and the shaft 3 are both made of a metal and are joined together by, for example, welding by electrical resistance, braze welding, or laser welding.

Similar to conventional art, in order to drill a hole with the dust suction drill 1 in a drilling object H, such a concrete wall, the cutting edge portions 20 of the drill tip 2 are brought into contact with the drilling object H, and the dust suction drill 1 is rotated about the axis line L. Inside the shaft 3, a dust suction passage 30 for sucking dust that is generated when the cutting edge portions 20 rotate is formed extending along the axis line L. Inside the shaft 3, a dust removal passage 34 perpendicular to the dust suction passage 30 is formed at the proximal end of the dust suction passage 30. The dust removal passage 34 is open at the side surface of the shaft 3.

The three cutting edge portions 20 are provided on the distal end surface of the drill tip 2 at substantially regular intervals, and are spaced apart from each other in the circumferential direction. The three cutting edge portions 20 are made of a hard metal and integrally formed on the drill tip 2. As is well known in the art, each cutting edge portion 20 has a rake face 22 formed on its forward side with respect to a rotation direction R of the dust suction drill 1, and has a relief face 23 formed on its backward side with respect to the rotation direction R. In each cutting edge portion 20, a joint ridge between the rake face 22 and the relief face 23 forms a sharp cutting edge 21. The cutting edges 21 extend radially from the center of the drill tip 2, and at the center of the drill tip 2, form a highest pointed end, i.e., a chisel point P. That is, each cutting edge 21 gradually slopes from the chisel point P in the outward radial direction of the drill tip 2. A dust suction hole 24, which communicates with the dust suction passage 30 of the shaft 3, is formed in one rake face 22 or relief face 23 closely to the chisel point P. Since the drill tip 2 is made of a hard metal, the dust suction hole 24 is formed at the same time as forming the drill tip 2. The dust suction hole 24 may be formed by, for example, cutting or electric discharge machining.

A fitting recess 33 is formed in the peripheral surface of the shaft 3, and a dust suction device adaptor 4 made of a synthetic resin is fitted to the peripheral surface of the shaft 3 in such a manner that the dust suction device adaptor 4 covers the fitting recess 33. That is, a part of the peripheral surface of the shaft 3 serves as an "attachment portion" of the present invention. A through-hole 42, which communicates with the dust removal passage 34, is formed in the dust suction device adaptor 4. The through-hole 42 is connected to a dust suction device (not shown), such as a vacuum cleaner. A fitting protrusion 43 protrudes inward from the inner surface of the dust suction device adaptor 4. The fitting protrusion 43 is fitted in the fitting recess 33 of the shaft 3, thereby preventing the dust suction device adaptor 4 from detaching from the shaft 3. In the shaft 3, rearward from a flange 31, an auxiliary passage 32 communicating with the dust suction passage 30 is formed extending diagonally relative to the dust suction passage 30. The function of the auxiliary passage 32 will be described below.

(Hole Drilling Operation)

In the case of drilling a hole with the dust suction drill 1 in a drilling object H such as a concrete wall, first, the dust suction device adaptor 4 is attached to the peripheral surface of the shaft 3. The chisel point P of the drill tip 2 is brought into contact with the drilling object H, and the electric drilling tool is driven to rotate the dust suction drill 1 about the axis line L. Since the chisel point P is a pointed end, the chisel point P is in point contact with the drilling object H during the hole drilling. This makes it possible to prevent axial runout of the dust suction drill 1. That is, if the shape of the distal end of the drill tip 2 is linear or planar, axial runout may occur when the dust suction drill 1 rotates. However, the dust suction drill 1 according to the present embodiment reduces such a risk.

The dust suction device is driven when the dust suction drill 1 is rotated. Dust that is generated due to the cutting by the cutting edges 21 is sucked through the dust suction hole 24, then passes through the dust suction passage 30, the dust removal passage 34, and the through-hole 42, and is thereafter sucked into the dust suction device. Since the cutting edge portions 20 are made of a metal and integrally formed on the drill tip 2, the dust suction hole 24 can be formed closely to the chisel point P. Consequently, the dust generated by the chisel point P and the cutting edges 21 during the hole drilling is efficiently sucked into the dust suction hole 24.

By pushing the rotating dust suction drill 1 forward into the drilling object H, a pilot hole having a predetermined depth is formed. During the hole drilling, there is a case where the dust and the like lump up and clog the inside of the dust suction passage 30. When the dust and the like clog the inside of the dust suction passage 30, the dust suction effect is not sufficiently achieved.

In this case, the rotation of the dust suction drill 1 is stopped temporarily. Then, as described below, an elongated removal member is inserted from the auxiliary passage 32, and the distal end of the removal member is inserted into the dust suction passage 30. By crushing and pushing the clogging dust and the like out of the dust suction passage 30 with the distal end of the removal member, the dust and the like can be easily removed from the dust suction passage 30. That is, the dust crushed and pushed out of the dust suction passage 30 is sucked by the dust suction device through the dust removal passage 34 and the through-hole 42. Here, it is also conceivable to insert the removal member from the dust suction hole 24. In such a case, however, the dust suction drill 1 needs to be temporarily pulled out of the pilot hole. Since the auxiliary passage 32 is formed in the shaft 3, the dust and the like clogging the inside of the dust suction passage 30 can be removed without pulling the dust suction drill 1 out of the pilot hole. Removing the dust and the like with the removal member inserted from the auxiliary passage 32 and sucking the removed dust and the like with the dust suction device may be performed at the same time. In this manner, the dust and the like can be easily and efficiently removed.

Figure 4:
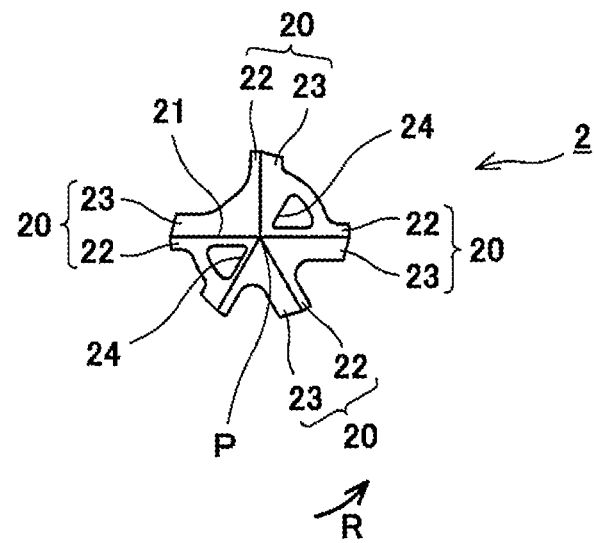
FIG. 4 is a plan view of another dust suction drill.
Figure 5:
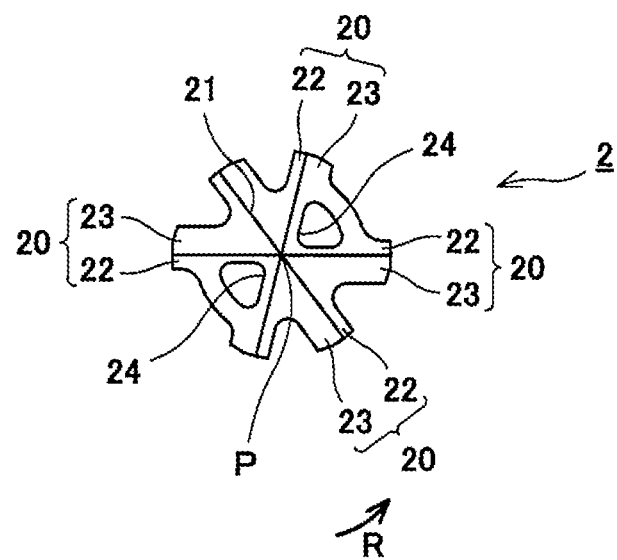
FIG. 5 is a plan view of yet another dust suction drill.

In the above-described embodiment, the three cutting edge portions 20 are provided on the drill tip 2. However, the number of cutting edge portions 20 is not limited to three. For example, as shown in FIG. 4, five cutting edge portions 20 may be provided such that they extend radially from the chisel point P. Alternatively, as shown in FIG. 5, six cutting edge portions 20 may be provided such that they extend radially from the chisel point P. In the above-described embodiment, one dust suction hole 24 is formed in the rake face 22 or the relief face 23. However, as an alternative, two dust suction holes 24 or three or more dust suction holes 24 may be formed as shown in FIG. 4 and FIG. 5.

(Embodiment 2)

The dust that is generated during the drilling of the pilot hole is not entirely sucked by the dust suction drill 1, but is partly scattered around the pilot hole. With the dust suction drill 1 shown in FIG. 1 or a conventional dust suction drill, the dust scattered around the pilot hole is not sufficiently sucked. Thus, there is a problem that powder dust is scattered around the pilot hole, causing a negative impact. In view of this problem, the inventors of the present invention have come up with detachably attaching a dust scattering prevention cover to the dust suction drill.

Figure 6:
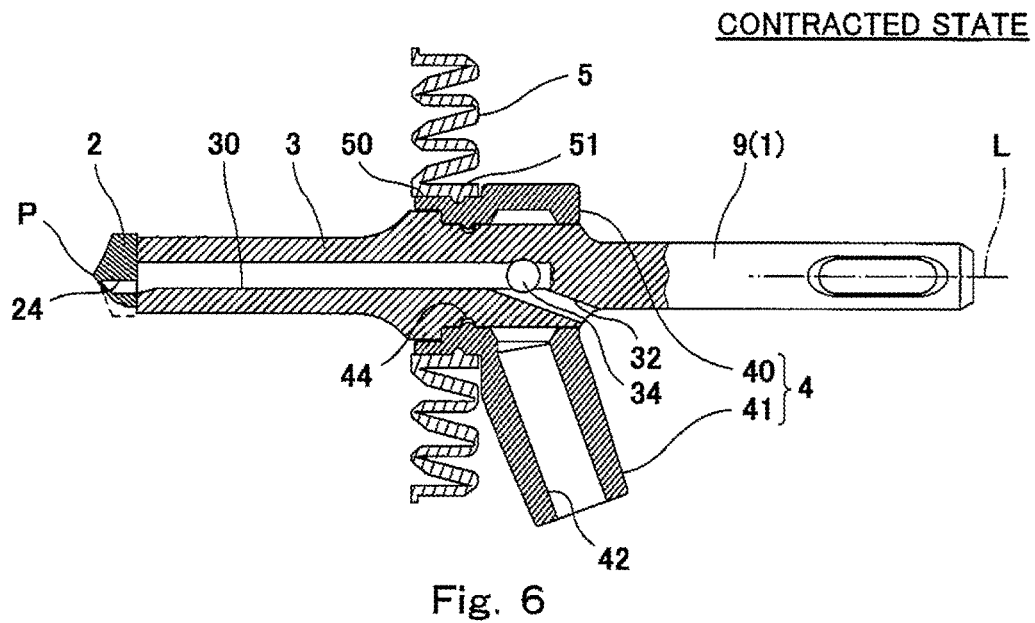
FIG. 6 is a sectional view showing a state where a dust scattering prevention cover is attached to the dust suction drill to which a dust suction device adaptor is attached.
Figure 7:
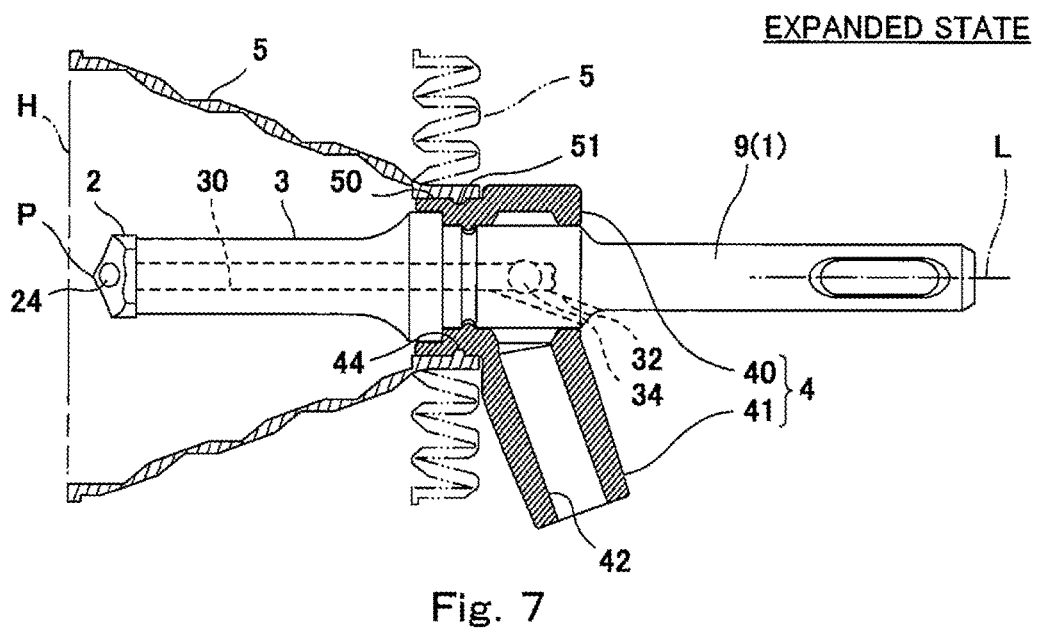
FIG. 7 shows the dust scattering prevention cover being in use.

FIG. 6 is a sectional view showing a state where a dust scattering prevention cover 5 is attached to the dust suction drill 1 to which the dust suction device adaptor 4 is attached. FIG. 7 shows the dust scattering prevention cover 5 being in use. The dust suction device adaptor 4 includes: a first cylindrical body 40; and a second cylindrical body 41, which extends diagonally from the first cylindrical body 40 and in which the through-hole 42 is formed.

The dust scattering prevention cover 5 is made of a synthetic resin or a rubber material, and has an annular shape when seen in a plan view. The dust scattering prevention cover 5 is bellows-shaped and formed radially outward from its center. An opening 50 is formed in the central portion of the dust scattering prevention cover 5, and the outer periphery of the first cylindrical body 40 is fitted in the opening 50. A protrusion 51 is formed on the inner wall of the opening 50, and a recess 44 is formed in the outer periphery of the dust suction device adaptor 4 at a position corresponding to the position of the protrusion 51.

The dust scattering prevention cover 5 is fitted from the distal end side of the dust suction drill 1. In a state where the opening 50 is in contact with the flange 31 and the outer periphery of the first cylindrical body 40, the protrusion 51 fits in the recess 44. When the dust scattering prevention cover 5 is initially attached to the dust suction drill 1, as shown in FIG. 6, the dust scattering prevention cover 5 is positioned in a plane perpendicular to the shaft 3 and is in a lateral orientation. Such a state of the dust scattering prevention cover 5 is referred to as a contracted state. When the dust scattering prevention cover 5 is in the contracted state, the drill tip 2 is exposed, and the chisel point P of the drill tip 2 can be brought into contact with a target position on the drilling object H. When a user manually pushes forward a peripheral edge portion of the dust scattering prevention cover 5 in the contracted state, the dust scattering prevention cover 5 expands forward as shown in FIG. 7 owing to the elasticity of the dust scattering prevention cover 5. Such a state of the dust scattering prevention cover 5 is referred to as an expanded state. When the dust scattering prevention cover 5 is in the expanded state, the dust scattering prevention cover 5 enshrouds the drill tip 2. That is, as shown in FIG. 7, in the expanded state, the front end of the dust scattering prevention cover 5 is positioned further forward than the drill tip 2 and can cover a pilot hole to be drilled.

In order to drill a hole with the dust suction drill 1, the dust scattering prevention cover 5 is set in the contracted state, and the chisel point P of the drill tip 2 is brought into contact with a target position on the drilling object H. Thereafter, the dust scattering prevention cover 5 in the contracted state is brought into the expanded state. As a result, the front end of the dust scattering prevention cover 5 comes into contact with the drilling object H.

Figure 8:
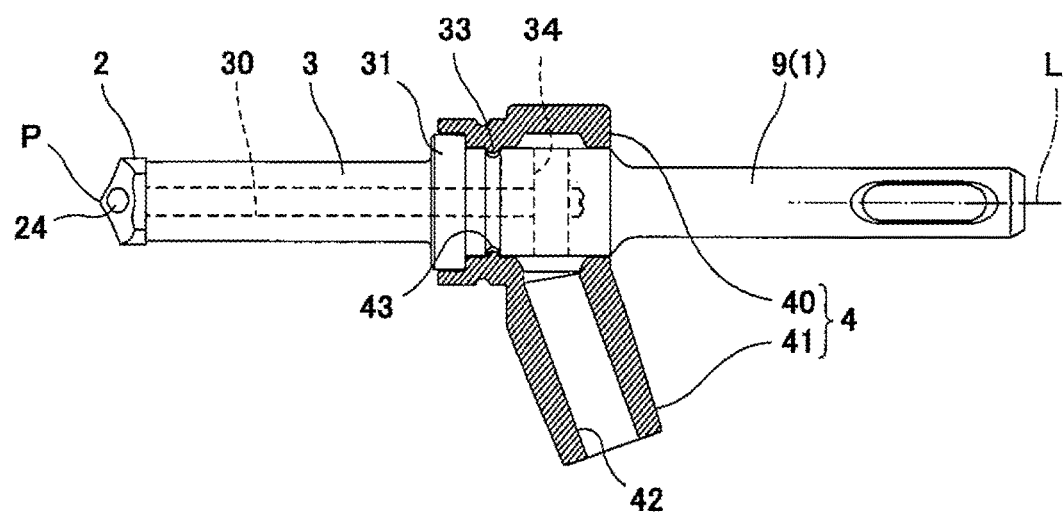
FIG. 8 is an elevation view of yet another dust suction drill.

FIG. 8 is an elevation view showing another dust suction drill 1. On the peripheral surface of the shaft 3, the flange 31 for restricting the depth of a hole drilled by the drill tip 2 is provided between the dust removal passage 34 and the drill tip 2. The above-described dust suction device adaptor 4 is fitted to the peripheral surface of the shaft 3, such that the front end portion of the dust suction device adaptor 4 is in contact with the flange 31. That is, on the peripheral surface of the shaft 3, the flange 31 and a portion at the rear of the flange 31 serve as the "attachment portion" of the present invention.

Figure 9:
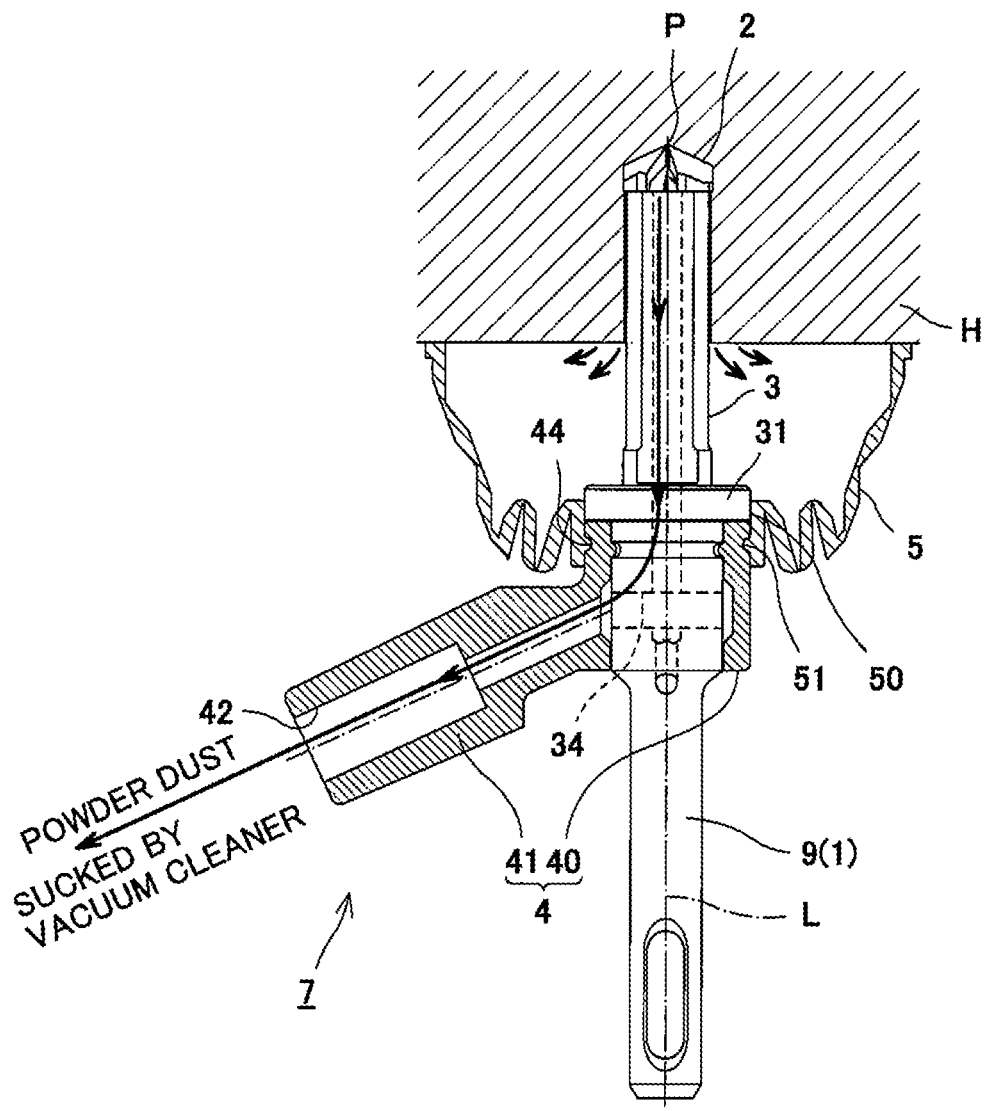
FIG. 9 shows a hole drilling operation that is performed in a case where a drilling object is a ceiling wall.

FIG. 9 shows a hole drilling operation that is performed in a case where the drilling object H is a ceiling wall. When the rotating dust suction drill 1 is pushed forward, even though the dust is sucked through the dust suction hole 24, part of the dust is scattered outward from the pilot hole. However, since the dust scattering prevention cover 5 in the expanded state covers the pilot hole, the dust that is scattered during the drilling of the pilot hole stays within the dust scattering prevention cover 5, and thereby the dust is prevented from being scattered outside the dust scattering prevention cover 5. This makes it possible to reduce the negative impact to the surroundings of the pilot hole due to the scattered dust. In addition, the scattered dust does not come into contact with a worker performing the hole drilling work under the ceiling wall.

Since the dust scattering prevention cover 5 is elastic, when the dust suction drill 1 is pushed forward during the drilling of the pilot hole, the dust scattering prevention cover 5 is deformed in accordance with the pushing, such that the peripheral edge portion around the opening 50 contracts as shown in FIG. 9. Thus, the dust scattering prevention cover 5 does not hinder the forward movement of the dust suction drill 1.

After the hole drilling is ended, the dust suction drill 1 is pulled out of the pilot hole, and the dust scattering prevention cover 5 is manually pushed back into the contracted state. Then, the worker can proceed to the next pilot hole drilling operation. It should be noted that the dust scattering prevention cover 5 can be removed from the dust suction drill 1 by removing the protrusion 51 from the recess 44 and then pulling the dust scattering prevention cover 5 forward against the friction with the flange 31.

Figure 16:
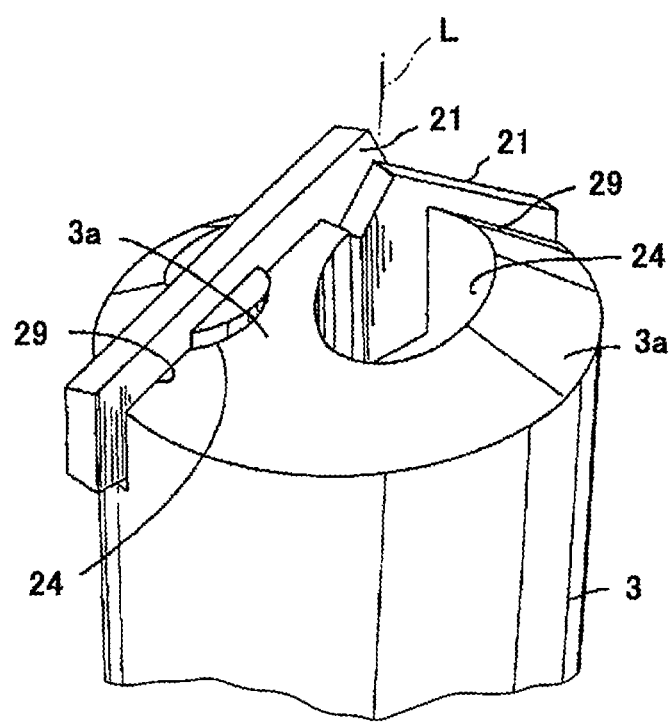
FIG. 16 is a perspective view showing a conventional dust suction drill.

A dust suction unit 7 is formed by attaching the dust scattering prevention cover 5 to the dust suction drill 1 (see FIG. 9). The dust suction drill 1 forming part of the dust suction unit 7 need not be the dust suction drill 1 shown in FIG. 1, in which the dust suction hole 24 is close to the chisel point P. That is, the dust suction unit 7 can be formed also by using the conventional dust suction drill 1 shown in FIG. 16. There is a case where the dust suction drill 1 is formed such that the distal end of the dust suction passage 30 of the shaft 3 is open at the side surface of the shaft 3. The dust suction unit 7 can be formed also by using such a dust suction drill 1.

(Removal Member)

Figure 10A:
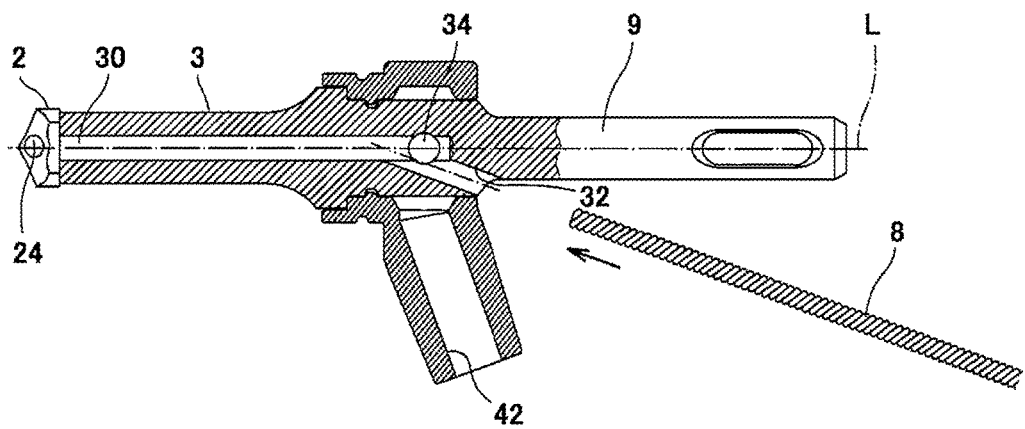
FIGS. 10A and 10B are sectional views each showing a removal member.
Figure 10B:
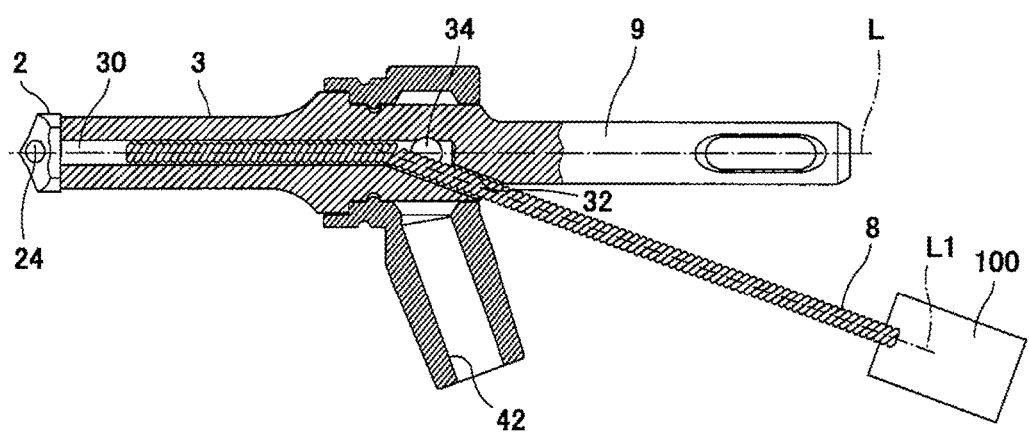

In the above description, the removal member is inserted from the auxiliary passage 32, and dust and the like clogging the inside of the dust suction passage 30 are crushed and pushed out of the dust suction passage 30 by the removal member. FIGS. 10A and 10B are sectional views each showing such a removal member 8. The removal member 8 is formed by an elongated coil spring extending in one direction. The external diameter of the removal member 8 is slightly less than the internal diameter of the auxiliary passage 32. The removal member 8 is inserted into the auxiliary passage 32, and after bending at the point of intersection between the dust suction passage 30 and the auxiliary passage 32, the removal member 8 enters the dust suction passage 30. Since the removal member 8 needs to crush and push the dust and the like out of the dust suction passage 30, the removal member 8 must not deform easily when coming into contact with the dust and the like. For this reason, the removal member 8 is formed by the coil spring whose wire diameter is a predetermined diameter or more, such that the removal member 8 is deformable but has certain rigidity. In the embodiment shown in FIG. 10A and FIG. 10B, the removal member 8 is formed such that, when seen from its proximal end side, the removal member 8 is a left-handed coil.

As shown in FIG. 10B, the removal member 8 is inserted into the auxiliary passage 32, and the distal end of the removal member 8 is inserted into the dust suction passage 30 after passing the point of intersection between the dust suction passage 30 and the auxiliary passage 32. In this state, a rotation motor 100 is attached to the proximal end of the removal member 8, and the removal member 8 is rotated clockwise as seen from its proximal end side about a central axis L1 extending in the longitudinal direction. Since the removal member 8 is a left-handed coil spring, when the removal member 8 is rotated clockwise, the removal member 8 contracts such that the turns of the coil spring come into close contact with each other. In this manner, the rigidity of the removal member 8 can be further increased, which makes it possible to easily remove the dust from the inside of the dust suction passage 30. That is, it will suffice if the winding direction of the coil spring of the removal member 8 is opposite to the direction of the rotation driven by the rotation motor 100. For example, the removal member 8 may be a right-handed coil spring, and the removal member 8 may be rotated counterclockwise.

(Variation of Removal Member)

Figure 11:
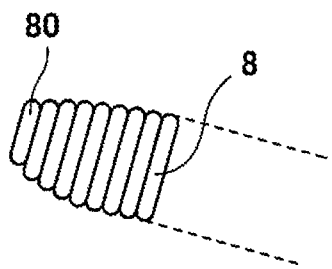
FIG. 11 shows a variation of the removal member.

As shown in FIG. 11, the insertion end of the removal member 8 to be inserted into the auxiliary passage 32, i.e., the distal end of the removal member 8, may be provided with a diameter-reduced portion 80 whose winding diameter is less than the winding diameter of the other portion of the removal member 8. This makes it possible to easily insert the removal member 8 into the auxiliary passage 32. In addition, since the distal end of the removal member 8 is formed as the diameter-reduced portion 80, it easily cuts into the dust and like, and the dust and the like can be removed easily.

Figure 12:
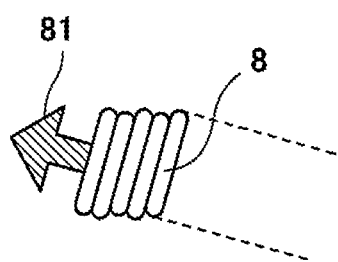
FIG. 12 shows another variation of the removal member.

As shown in FIG. 12, the distal end of the removal member 8 may be provided with a metal pointed head member 81 having a pointed end. By rotating the pointed head member 81 together with the removal member 8 and causing the pointed head member 81 to cut into the dust inside the dust suction passage 30, the dust can be easily crushed and pushed out of the dust suction passage 30.

The dust suction drill 1 and the dust suction unit 7 according to the present embodiment achieve advantageous effects as described below.

1. Since each cutting edge portion 20 is made of a metal and integrally formed on the drill tip 2, the dust suction hole 24 can be formed in the rake face 22 or the relief face 23 of the cutting edge portion 20 closely to the chisel point P. Consequently, the dust generated by the chisel point P during the hole drilling is efficiently sucked into the dust suction hole 24. Since the chisel point P is a pointed end, the chisel point P is in point contact with the drilling object during the hole drilling. This makes it possible to prevent axial runout of the dust suction drill 1.

2. During the use of the dust suction drill 1, if dust and the like clog the inside of the dust suction passage 30, the removal member is inserted from the auxiliary passage 32, and the distal end of the removal member is inserted into the dust suction passage 30. By pushing the clogging dust and the like out of the dust suction passage 30 with the distal end of the removal member, the dust and the like can be easily removed from the dust suction passage 30.

3. During the hole drilling, even though the dust is sucked through the dust suction hole 24, part of the dust is scattered outward from the pilot hole. However, since the dust scattering prevention cover 5 covers the pilot hole, the dust that is scattered during the drilling of the pilot hole stays within the dust scattering prevention cover 5, and thereby the dust is prevented from being scattered outside the dust scattering prevention cover 5. This makes it possible to reduce the negative impact to the surroundings of the pilot hole due to the scattered dust.

Figure 13:
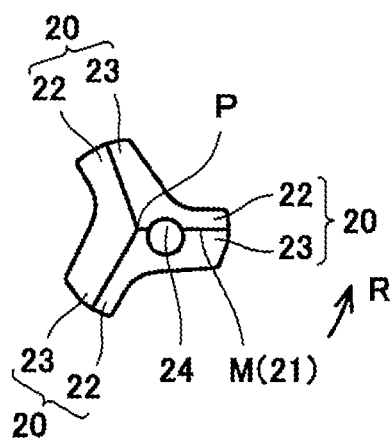
FIG. 13 is a plan view of yet another dust suction drill.

In the above-described embodiments, the dust suction hole 24 is formed in the rake face 22 or the relief face 23 closely to the chisel point P. However, as an alternative, the dust suction hole 24 may be formed closely to the chisel point P in such a manner that the dust suction hole 24 is positioned over a joint ridge M between the rake face 22 and the relief face 23 (i.e., over the cutting edge 21) as shown in FIG. 13.

Figure 14:
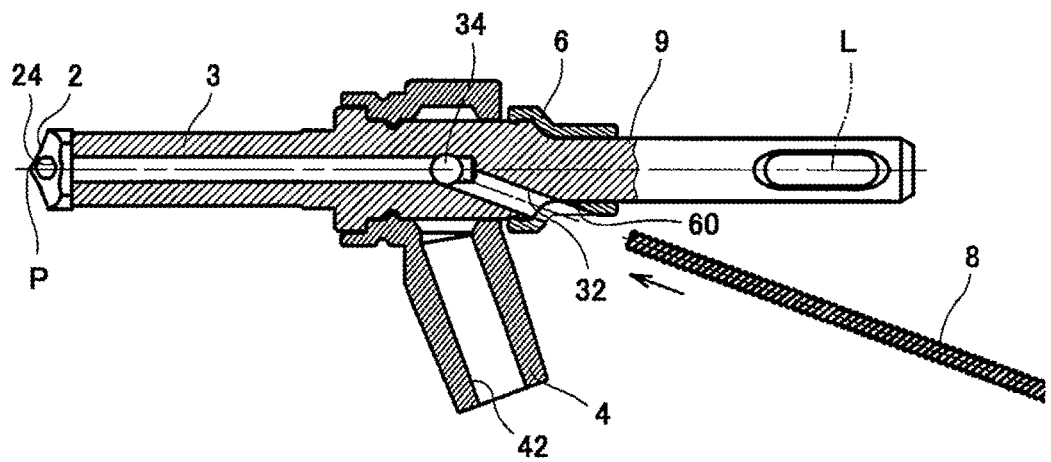
FIG. 14 is a side sectional view of the dust suction drill to which an auxiliary passage closing cover is attached.
Figure 15A:
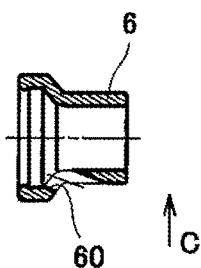
FIG. 15A is a side sectional view of the auxiliary passage closing cover.
Figure 15B:
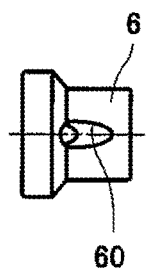
FIG. 15B shows the view of FIG. 15A as seen in a direction C of FIG. 15A.

Further, as shown in FIG. 14, an auxiliary passage closing cover 6 may be provided on the shaft 3 or the shank 9 at the rear of the dust suction device adaptor 4. The auxiliary passage closing cover 6 is such a cover that, as shown in FIG. 15A and FIG. 15B, one passing hole 60 configured to face the auxiliary passage 32 is formed in one side of the cover. The auxiliary passage closing cover 6 can be rotated about the axis line L on the shaft 3 or the shank 9. As shown in FIG. 14, in a state where the passing hole 60 faces the auxiliary passage 32, the removal member 8 can be inserted into the auxiliary passage 32 through the passing hole 60. In the state shown in FIG. 14, the auxiliary passage 32 can be closed by rotating the auxiliary passage closing cover 6 about the axis line L such that the passing hole 60 no longer faces the auxiliary passage 32.

In the case of using the dust suction drill 1 in a normal manner without using the removal member 8, the auxiliary passage closing cover 6 is attached to the shaft 3 or the shank 9, such that the passing hole 60 does not face the auxiliary passage 32. This state is referred to as a closed state. When the dust suction device is attached to the through-hole 42 in the closed state, reduction in the dust suction force of the dust suction device does not occur since the auxiliary passage 32 is closed. In order to use the removal member 8, as described above, the auxiliary passage closing cover 6 may be rotated about the axis line L, such that the passing hole 60 faces the auxiliary passage 32. This state is referred to as an open state.

It should be noted that the material of the auxiliary passage closing cover 6 is not particularly limited. However, for example, if the auxiliary passage closing cover 6 is made of a rubber that has a high frictional coefficient against the dust suction drill 1, the auxiliary passage closing cover 6 does not easily rotate during the use of the dust suction drill 1, and thus the usability is improved. In the above description, the number of passing holes 60 formed in the auxiliary passage closing cover 6 is one. However, as an alternative, a plurality of passing holes 60 may be formed in the auxiliary passage closing cover 6, so long as the auxiliary passage 32 can be closed.

INDUSTRIAL APPLICABILITY

The present invention is useful when applied to a dust suction drill and a dust suction unit that are used for performing the work of drilling a hole in a drilling object, such as concrete or stone, and that are configured to suck dust generated during the hole drilling.

REFERENCE SIGNS LIST 1 dust suction drill
2 drill tip
3 shaft
4 dust suction device adaptor
5 dust scattering prevention cover
6 auxiliary passage closing cover
7 dust suction unit
8 removal member
20 cutting edge portion
21 cutting edge
22 rake face
23 relief face
24 dust suction hole
30 dust suction passage
32 auxiliary passage

The invention claimed is:

1. A dust suction drill comprising:
a drill tip with cutting edge portions formed on a distal end of the drill tip;
a shaft joined to the drill tip and configured to rotate about an axis line; and
a dust suction passage for sucking dust that is generated when the cutting edge portions rotate, the dust suction passage being formed inside the shaft, wherein
the dust suction passage is formed extending substantially parallel to the axis line;
the cutting edge portions and the drill tip are made of a metal and integrally formed together,
the cutting edge portions are provided on a distal end surface of the drill tip and spaced apart from each other in a circumferential direction,
cutting edges, each of which is formed by a joint ridge between a rake face and a relief face of a corresponding one of the cutting edge portions, are arranged radially, and at a center of the drill tip, form a chisel point, which is a pointed end, and
a dust suction hole, which communicates with the dust suction passage, is formed in the rake face or the relief face closely to the chisel point, or formed over the joint ridge between the rake face and the relief face closely to the chisel point; and further including
an auxiliary passage, which communicates with the dust suction passage and in which a removal member for pushing dust out of the dust suction passage is insertable, is formed in the shaft; and
an auxiliary passage closing cover that is attached to the shaft, the auxiliary passage closing cover being configured to rotate about the axis line and switch a state of the auxiliary passage between a closed state and an open state by rotating about the axis line.

2. The dust suction drill according to claim 1, wherein:
a dust scattering prevention cover is detachably attached to the shaft at a position that is away from the drill tip along the axial line, the dust scattering prevention cover covering a pilot hole drilled by the drill tip.

3. The dust suction drill according to claim 2, wherein:
an attachment portion, to which a dust suction device adaptor is attached, is provided at a position that is away from the drill tip, the dust suction device adaptor being configured to communicate with the dust suction passage, and
the dust scattering prevention cover is detachably attached to the attachment portion or the dust suction device adaptor.

4. The dust suction drill according to claim 2, wherein:
the dust scattering prevention cover is elastically deformable such that a state of the dust scattering prevention cover is switchable between an expanded state where the dust scattering prevention cover enshrouds the drill tip and covers the pilot hole and a contracted state where the drill tip is exposed.

5. The dust suction drill according to claim 1, wherein:
a flange that restricts a depth of a hole drilled by the drill tip is provided on the shaft.

6. A dust suction drill comprising:
a drill tip with cutting edge portions formed on a distal end of the drill tip;
a shaft joined to the drill tip and configured to rotate about an axis line; and
a dust suction passage for sucking dust that is generated when the cutting edge portions rotate, the dust suction passage being formed inside the shaft, wherein
the dust suction passage is formed extending substantially parallel to the axis line;
the cutting edge portions and the drill tip are made of a metal and integrally formed together,
the cutting edge portions are provided on a distal end surface of the drill tip and spaced apart from each other in a circumferential direction,
cutting edges, each of which is formed by a joint ridge between a rake face and a relief face of a corresponding one of the cutting edge portions, are arranged radially, and at a center of the drill tip, form a chisel point, which is a pointed end, and
a dust suction hole, which communicates with the dust suction passage, is formed in the rake face or the relief face closely to the chisel point, or formed over the joint ridge between the rake face and the relief face closely to the chisel point; and further including an auxiliary passage, which communicates with the dust suction passage and in which a removal member for pushing dust out of the dust suction passage is insertable, is formed in the shaft; and wherein the removal member is formed by an elongated coil spring and driven to rotate about a central axis in a state where the removal member is inserted in the auxiliary passage, and a winding direction of the coil spring is opposite to a direction in which the removal member is driven to rotate.

7. The dust suction drill according to claim 6, and further including a dust scattering prevention cover that is detachably attached to the dust suction drill and that covers a pilot hole drilled by the drill tip.

* * * * *